United States Patent
Grueger et al.

(10) Patent No.: US 10,732,040 B2
(45) Date of Patent: Aug. 4, 2020

(54) MONOLITHICALLY CONFIGURED SPECTROSCOPIC INSTRUMENT

(71) Applicant: Fraunhofer-Gesellschaft zur Foerderung der angewandten Forschung e.V., Munich (DE)

(72) Inventors: Heinrich Grueger, Dresden (DE); Jens Knobbe, Dresden (DE); Tino Puegner, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/425,685

(22) Filed: May 29, 2019

(65) Prior Publication Data

US 2019/0368931 A1 Dec. 5, 2019

(30) Foreign Application Priority Data

Jun. 1, 2018 (DE) .................. 10 2018 208 684

(51) Int. Cl.
*G01J 3/28* (2006.01)
*G01J 3/26* (2006.01)
(Continued)

(52) U.S. Cl.
CPC . *G01J 3/26* (2013.01); *G01J 3/06* (2013.01); *G01J 3/14* (2013.01); *G01J 3/18* (2013.01); *G01J 2003/1295* (2013.01)

(58) Field of Classification Search
CPC ........ G01J 3/26; G01J 3/14; G01J 3/06; G01J 3/18; G01J 2003/1295; G01J 3/0259;
(Continued)

(56) References Cited

U.S. PATENT DOCUMENTS 8,045,159 B2   10/2011   Egloff et al.
2005/0057750 A1   3/2005   Schenk et al.
(Continued)

FOREIGN PATENT DOCUMENTS

DE   19955759 A1   5/2001
DE   10061765 A1   3/2003
(Continued)

OTHER PUBLICATIONS

Heinrich Grüger, et al., "First application close measurements applying the new hybrid integrated MEMS spectrometer", Proc. of SPIE vol. 8726, 872609 (2013).
(Continued)

*Primary Examiner* — Abdullahi Nur
(74) *Attorney, Agent, or Firm* — Michael A. Glenn; Perkins Coie LLP

(57) ABSTRACT

A spectroscopic instrument includes a first aperture limiting device, a second aperture limiting device, a first mirror, a movable MEMS mirror, and a dispersive element spatially separate from the MEMS mirror, the movable MEMS mirror being movable in relation to the dispersive element, the movable MEMS mirror being monolithically configured as a common component with at least one of the first aperture limiting device, the second aperture limiting device, and the dispersive element, and the first and second aperture limiting devices being arranged to be spatially separate from the movable MEMS mirror and having a lateral offset from a rotational axis of the movable MEMS mirror.

27 Claims, 8 Drawing Sheets

(51) Int. Cl.
*G01J 3/18* (2006.01)
*G01J 3/06* (2006.01)
*G01J 3/14* (2006.01)
*G01J 3/12* (2006.01)

(58) Field of Classification Search
CPC ...... G01J 3/0291; G01J 3/0229; G01J 3/0275; G01J 2003/064; G01J 3/021; G01J 3/28; G01J 3/02
See application file for complete search history.

(56) References Cited

U.S. PATENT DOCUMENTS

| | | |
|---|---|---|
| 2005/0057751 A1 | 3/2005 | Schenk et al. |
| 2009/0262346 A1 | 10/2009 | Egloff et al. |
| 2012/0236382 A1 | 9/2012 | Puegner et al. |
| 2017/0211974 A1* | 7/2017 | Haldane ................ G01J 3/0237 |

FOREIGN PATENT DOCUMENTS

| | | |
|---|---|---|
| DE | 102004046983 A1 | 4/2006 |
| DE | 102008019600 A1 | 10/2009 |
| DE | 102010040768 A1 | 3/2012 |
| DE | 102016221303 A1 | 5/2018 |
| DE | 102017204740 A1 | 9/2018 |
| EP | 1474665 B1 | 9/2006 |
| EP | 1474666 B1 | 8/2007 |
| WO | 2018077956 A1 | 5/2018 |

OTHER PUBLICATIONS

Tino Puegner, et al., "Basic angles in microelectromechanical system scanning grating spectrometers", Applied Optics vol. 50, No. 24, Aug. 20, 2011, 4894-4902.

Ting Pügner, et al., "Near-Infrared Grating Spectrometer for Mobile Phone Applications", Applied Spectroscopy, vol. 70(5) 734-745 (2016).

\* cited by examiner

MONOLITHICALLY CONFIGURED SPECTROSCOPIC INSTRUMENT

CROSS-REFERENCE TO RELATED APPLICATION

This application claims priority from German Patent Application No. DE 10 2018 208 684.2, which was filed on Jun. 1, 2018, and is incorporated herein in its entirety by reference.

The invention relates to a spectroscopic instrument comprising a MEMS mirror, which is monolithically configured as a common component with at least one aperture limiting device or a dispersive element. In particular, the spectroscopic instrument is a miniaturized spectroscopic instrument comprising a wide spectral range which may be employed for spectral analyses of different kinds.

BACKGROUND OF THE INVENTION

The method of spectral analysis has been known and become established for laboratory use for a long time. Various approaches are possible. Samples which themselves emit radiation within an addressable range may be analyzed directly, so-called "emission spectroscopy".

If the sample emits no radiation, or if the intensity of the spectral range addressed is not sufficient, additional illumination means may be used. This is usually the case with room temperature. Following interaction with the material of the sample, the change in the incident light is analyzed by means of a suitable system.

The light source may be of various kinds. Often, one uses broadband emission sources whose spectral distribution comes as close as possible to the physical ideal of a so-called black-body emitter, or broadband emission sources which at least come close to same and exhibit high stability. Alternatively, illumination may also be effected by means of a spectrally narrow-band light source. Within this context, several methods are possible.

So-called Raman spectroscopy analyzes the shift in a wavelength, typically of a very narrow-band laser, even though both higher and lower wavelengths are possible.

Fluorescence measurements exploit excitation by means of a wavelength and sense a fluorescent wavelength of a well-defined fluorescent process which deviates therefrom. If a light source is available whose spectral distribution may be adjusted (a so-called tunable light source), said light source may be advantageously used for spectral analytics. In addition, it is possible to provide such an arrangement of a tunable light source by combining a broadband light source and a spectroscopic instrument.

As far as terms are concerned, specialized literature distinguishes between monochromators, i.e. devices which break up incident spectral distribution into its constituents, and spectrometers, i.e. devices which make available the intensity distribution of the incident light in a suitable form. Depending on the image field present at the optical output of such a device, one may then also distinguish between a spectrograph (the image field is corrected in one dimension) or an imaging spectrometer (the image field is corrected in two dimensions). Under certain circumstances, this is very important for specific applications. The solution of a spectroscopic instrument which is described here may be fundamentally used for all design variants. The term "spectroscopic instrument", or sometimes also spectrometer, will be used as a generic term for all types, including a monochromator.

Conventional technology discloses numerous system approaches capable of analyzing a spectral distribution of electromagnetic radiation.

Previous spectrometers have used a screen on which the spectrum could be displayed and viewed by a user. In addition, the spectra could be captured by using classical photo plates and could be analyzed in terms of quality and quantity. Within this context, both prisms and gratings could be used as the diffractive element. Joseph von Fraunhofer (1787-1826) became famous, among other things, for discovering the sodium lines within the solar spectrum.

However, prism spectrographs are disadvantageous because of the inevitable absorption by the material, which is usually non-ideal, of the prism. What is advantageous are grating spectrometers, which benefit from the diffraction of light at periodic structures in transmission or reflection. During the course of the 20th century, different arrangements were described by Czerny-Turner, Ebert-Fastie and Monk-Gilleson, among others. Particular variants, for example gratings with specific structures (blaze) or the so-called Littrow mounting, exhibit specific advantages. Detailed descriptions are found in specialized literature.

With the advent of electrically readable detectors, the development continued and resulted in a scanning monochromator, wherein the intensity is effected by a photosensitive circuit. Adjustable diffractive elements allow tuning of the system and sensing of an overall spectrum.

The fact that the detectors were developed further into linear or planar arrangements (detector arrays) enabled development of so-called diode array spectrometers. Said specific variant of embodying a grating spectrograph comprises a fixed grating and a detector array or a camera. Of said type, there also exist embodied variants heavily reduced in size. The installation size is limited by the size of the detector.

For the visible spectral range, elements having very small dimensions are available. They are also available at very low price on account of utilization of silicon semiconductor technologies.

For the so-called infrared range, which is important for analyzing organic matter, in particular, silicon detectors so far can only be used for up to about 1100 nm due to the spectral sensitivity of the material. For anything above said value, less widespread material or material combinations may be employed. Specifically for array arrangements, these are very costly and comparatively large. Typical element widths amount to at least 25 µm, but typically 50 µm or more, since the signal noise otherwise becomes problematic.

A spectral range useful for analysis requirements typically includes a spectral width of 900 nm to 1000 nm or more. The resolution should be at least 10 nm to provide reliable evaluation. This results in that the detectors may comprise about 100 elements, so that, therefore, with increments of 2, which are typically used in digital technology, elements of 128 or more may typically be employed. This results in a width of at least 6 mm for the detector and, therefore, in addition to the high cost, also in a limited miniaturization potential. In addition, the optical setup may provide a correspondingly wide image field, which involves additional expenditure.

In parallel with developing diffractive spectroscopic instruments, systems based on interferometers have been implemented. Important representatives are Fabry Perrot filters and Fourier transformation (FT) spectrometers. Within this context, the spectral characteristic of an interferometer is changed and/or tuned, and the intensity distribution sensed at the same time is evaluated. The spectral intensity distribution is calculated by means of suitable transformation of the data. Such approaches have existed for a long time. Because of the sensitivity of the interferometer to vibrations, corresponding measures may be used. Current developments of MEMS-based Fabry Perrot filters and silicon-etched FT spectrometers are promising approaches regarding highly miniaturized systems within the field of infrared spectral analysis applications.

One important step toward implementing low-cost NIR spectrometers was to develop the "scanning grating spectrometer". EP 1 474 665 and EP 1 474 666 describe MEMS-based approaches (MEMS=micro-electromechanical system) which utilize a movable element and therefore make do with one single detector. In addition to the advantage in terms of cost, the dimensions of the system may be considerably reduced. The systems are very robust and may also be employed outside laboratory premises. Miniaturization is essentially limited by the useful adjustment of the components.

A further development of this approach was implemented by means of an advantageous manufacturing variant described in DE 10 2008 019 600 and has been referred to as MEMS hybrid spectrometer. Here, further miniaturization is achieved by two essential improvements. For one thing, more functional elements are integrated into the MEMS component. As a result, adjustment of the grating and of the slits may be effected by photolithography of process technology with a precision level that is much higher than that of any component adjustment. For another thing, the spectrometer is implemented as a stack of substrates, so that it will be possible, in principle, to build a large number of systems as a compound, to simplify adjustment and to subsequently separate the systems.

The properties of this approach to a system have been examined in detail and described in specialized literature [1]. The nature of the approach described, wherein the grating is located, in its non-deflected idle position, within the chip plane along with the two slits, has resulted in a new mathematical description [2]. The symmetry of the approach, which is due to the principle employed, i.e. the fact that the grating will usually oscillate to the same extent in both angular directions starting from the idle position, involves deviating from the classical approach of a Czerny-Turner spectrometer in the first-order diffraction since otherwise the same spectral range will be swept twice by positive and negative diffraction angles. This problem has been solved by using the first negative diffraction order. Within this context, the W-shaped optical path of the Czerny-Turner spectrometer is folded, and the entrance slit and the exit slits are shifted to the same side of the grating. One has succeeded in implementing a spectrometer having a design size of only 18×16×10 mm³.

It has been shown [3] that the design height may be reduced to as little as 6 mm or less, whereby integration into a mobile phone becomes possible. However, utilization of the folded optical path also entails a problem. Instead of the spherical on-axis mirrors that are commonly used with Czerny-Turner, biconical off-axis mirrors may be employed in order to achieve acceptable imaging performance. They are complex to manufacture, and with the technologies currently available, production in large numbers is possible only to a limited extent and/or not at sufficiently low cost.

A specific embodiment variant of the spectrometer with a fixed grating was presented in the last few years. Here, the necessity of a detector row is replaced by utilizing a spatial light modulator (digital light processor, DLP). A spatial light modulator, here the known DLP chip by Texas Instruments from the projector ("beamer"), is positioned within the image plane of the spectrograph having a fixed grating, and the spectrum is suitably imaged onto an individual detector.

During operation, a mirror is selected and positioned such that its corresponding spectral intensities of the wavelength interval impinge upon the (individual) detector, and all other wavelength ranges are masked out. Said promising approach is being employed in first products. The miniaturization potential is limited by the DLP design size, and the costs of the DLP are comparatively low as compared to current near-infrared spectrometers but are a limiting factor for utilization in mobile phones, as is its size.

The above-described methods of spectral analysis are currently becoming established from laboratory methods to standard methods for application in the field. In addition to portable systems for professional users, first devices for mass applications have been put on the market and are about to be employed in mobile phones.

For reliable spectral analysis, laboratory methods have been known and become established. In recent years, there has been a lot of investment in miniaturizing the components that may be employed for mobile use. One promising approach is MEMS-based spectral analytics, which exhibits advantages as compared to systems having fixed gratings in particular within the so-called near-infrared (NIR) spectral range, i.e. electromagnetic radiation within a wavelength interval from 780 nm to 2500 nm. With regard to the design size, considerable progress has been achieved [3]. Sufficient miniaturization seems feasible.

Many applications of spectral analysis additionally benefit from a large measuring range, which might start with ultraviolet (UV), include visible light (VIS) and reach as far as infrared (IR). The larger the numbers of pieces envisaged, the lower the implementation expenditure may turn out. Nevertheless, the user expects high resolution, high stability and reliability for his/her portable system, which should be as compact as possible.

The question concerning the spectral range may be solved, e.g., via the modulation range of a movable grating or via the width of a detector array in connection with a fixed grating. In addition to physical limits, for example the maximum deflectability of a miniaturized grating, economic aspects and the installation size achievable are also important. The system approaches disclosed in conventional technology impose limits in this respect.

Miniaturization is limited, in particular, by the useful adjustment of the individual components. To solve this problem, DE 100 61 765 A1 proposes integrating slit diaphragms into a torsion element. The slit diaphragms are arranged along the tilting, or torsional, axis of the torsion element, which renders production of the torsion element more difficult and, therefore, more expensive, however. The grating arranged on the torsion element additionally involves a high degree of deflection of the torsion element so as to select the individual wavelength ranges.

It would therefore be desirable to provide an improved spectroscopic instrument which solves the above-mentioned problems of conventional technology. In particular, it would be desirable to provide a spectral analysis system capable of addressing a wide spectral range given a high degree of miniaturization while being able to be implemented advantageously both with regard to installation size and manufacturing expenditure. In particular, the modulation range of the active component (e.g., MEMS mirror) should be as small as possible, and the technology used should be implemented in as simple a manner as possible so as to be able to be manufactured in mass production while being low in cost at the same time.

SUMMARY

According to an embodiment, a spectroscopic instrument may have: first aperture limiting device, a second aperture limiting device, a first mirror, a movable MEMS mirror, and a dispersive element spatially separate from the MEMS mirror, the movable MEMS mirror being movable in relation to the dispersive element, the first mirror being configured to influence, in a beam-shaping manner, electromagnetic radiation which enters through the first aperture limiting device, and to direct the influenced radiation to the movable MEMS mirror, the moveable MEMS mirror being configured to reflect the influenced radiation to the dispersive element, the dispersive element being configured to spectrally split up the influenced radiation and to reflect it back, within a limited wavelength range, to the moveable MEMS mirror, and the movable MEMS mirror further being configured to reflect the spectrally split-up radiation including the limited wavelength range to the first mirror or to a second mirror and from there to the second aperture limiting device, the movable MEMS mirror being monolithically configured as a common component with at least one of the first aperture limiting device, the second aperture limiting device, and the dispersive element, and the first and second aperture limiting devices being arranged to be spatially separate from the movable MEMS mirror and including a lateral offset from a rotational axis of the movable MEMS mirror.

The inventive spectroscopic instrument comprises, among other things, a first aperture limiting device, a second aperture limiting device, a first mirror, a moveable MEMS mirror, and a dispersive element spatially separate from the MEMS mirror. The moveable MEMS mirror is moveable in relation to the dispersive element. The first mirror is configured to influence, in a beam-shaping manner, electromagnetic radiation which enters through the first aperture limiting device, and to direct the influenced radiation to the moveable MEMS mirror. The moveable MEMS mirror is configured to reflect the radiation, which has been influenced in a beam-shaping manner by means of the first mirror, to the dispersive element. The dispersive element is configured to spectrally split up the reflected fraction of the radiation, which has been influenced in a beam-shaping manner by means of the first mirror, so that said radiation comprises a limited wavelength range. In addition, the dispersive element is configured to re-direct the radiation comprising the limited wavelength range back to the moveable MEMS mirror. The movable MEMS mirror is further configured to reflect the re-directed spectrally split-up radiation comprising the limited wavelength range to the first mirror or to a second mirror and from there to the second aperture limiting device. According to the invention, the moveable MEMS mirror is monolithically configured as a common component with at least one of the first aperture limiting device, the second aperture limiting device, and the dispersive element. Also, the first and second aperture limiting devices are both arranged to be spatially separate from the moveable MEMS mirror. Moreover, the first and second aperture limiting devices each exhibit a lateral offset from a rotational axis of the movable MEMS mirror.

The above-described arrangement results in a specific optical path within the spectroscopic instrument. The electromagnetic radiation may enter into the spectroscopic instrument through the first aperture limiting device. The radiation may then be directed to a rotatable and/or tiltable MEMS mirror via a first mirror, and from there onto a dispersive element. From said dispersive element, a wavelength-selected fraction of the radiation may be re-directed back to the moveable MEMS mirror, and from there on to the first mirror or a second mirror. The first, or possibly second, mirror then refocuses the wavelength-selected fraction of the radiation onto the second aperture limiting device.

Said arrangement of double reflection at the MEMS mirror enables cutting the amplitude of the deflection range (e.g., modulation range) of the MEMS mirror in half. This means that the inventive MEMS mirror needs to be deflected only half as much as comparable mirror of conventional technology in order to provide the same amount of wavelength selection.

In addition, the inventive spectroscopic instrument has the advantage that the monolithic configuration of the MEMS mirror with the first and/or second aperture limiting device and/or with the dispersive element renders mutual adjustment of the respective components, which may otherwise be used in conventional technology, superfluous.

Consequently, the components may be mutually arranged with a clearly higher degree of accuracy, which in turn enables further miniaturization as compared to spectroscopic instruments of conventional technology.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
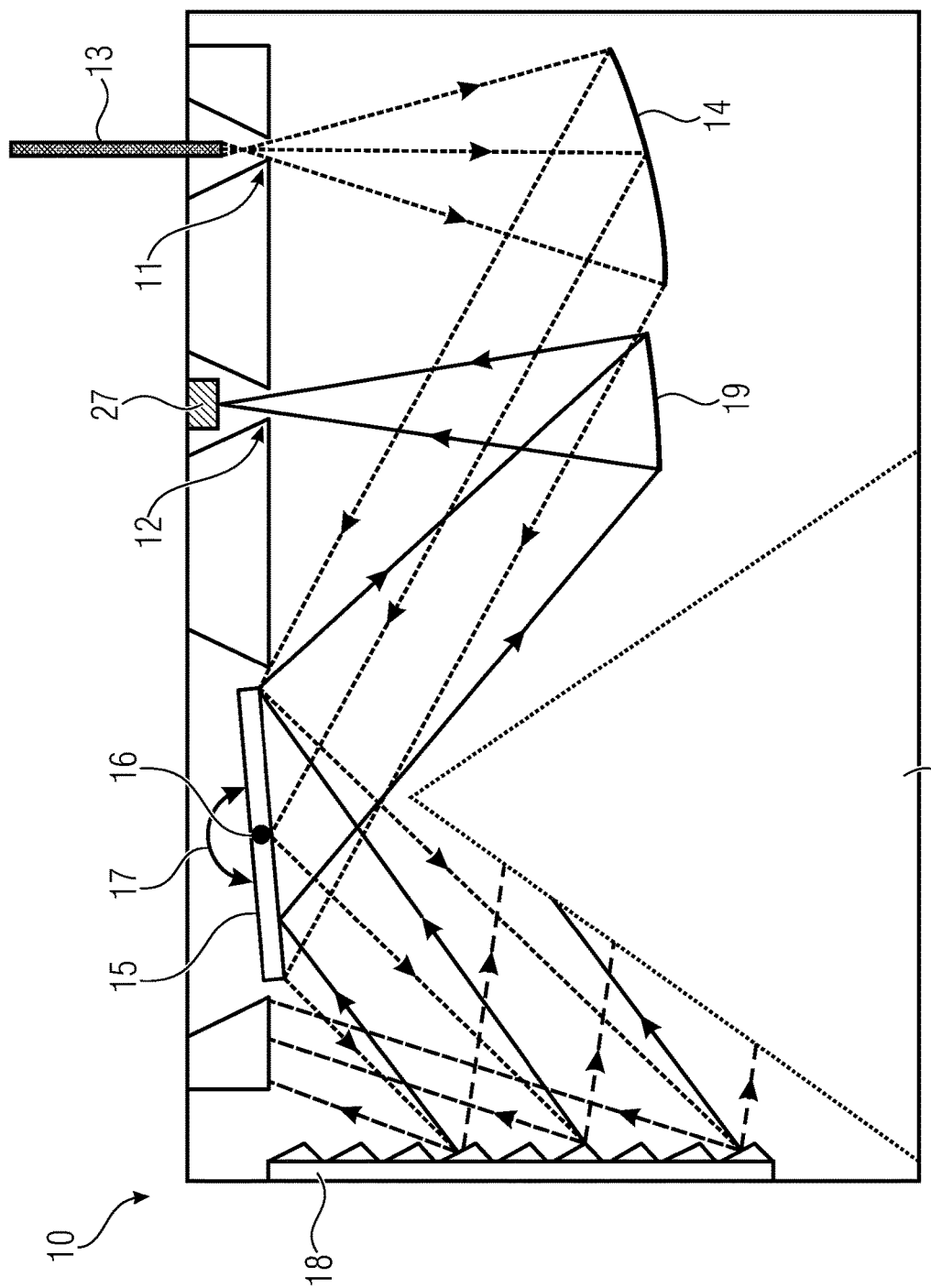
FIG. 1 shows a schematic lateral view of a spectroscopic instrument in accordance with an embodiment.

In the following, embodiments will be described in more detail with reference to the figures, elements having identical or similar functions being provided with identical reference numerals.

In addition, optical radiation shall be mentioned herein by way of example of electromagnetic radiation in general. Depending on the implementation of the inventive spectroscopic instrument, the optical radiation may be light of different wavelength ranges. For example, it may be infrared light, e.g., within the near-infrared range. However, in the inventive spectroscopic instrument it is also possible to use optical radiation within other wavelength ranges, e.g., within wavelength ranges which may range from ultraviolet (UV) to infrared (IR) via visible light (VIS).

In addition, slit diaphragms shall be mentioned as an example of aperture-limiting devices. Further conceivable examples of aperture limiting devices may be, for example, small openings, so-called pinholes, the ends of optical fibers, or optical waveguides, or the physical dimensions of a detector, of an opening of a housing of a detector component or of the sensitive surface area of a detector. Openings, e.g. in the case of slit diaphragms or pinholes, need not necessarily be configured as physical openings. Aperture limiting devices may also be provided by substrates comprising coatings configured accordingly, or may be substrate stacks exhibiting different optical properties.

FIG. 1 shows an inventive spectroscopic instrument 10. The spectroscopic instrument 10 comprises a first aperture limiting device 11 and a second aperture limiting device 12.

Electromagnetic radiation 13 may enter inside the spectroscopic instrument through the first aperture limiting device 11. Also, the electromagnetic radiation 13 may exit from inside the spectroscopic instrument 10 through the second aperture limiting device 12. When passing through the respective aperture limiting device 11, 12, the electromagnetic radiation 13 may be filtered; filtering of the radiation 13 may be effected, for example, within the image plane, within an aperture plane, within a plane conjugate to the former, or between said planes. Within this context, the radiation 13 may be locally and/or spatially filtered with regard to an object plane.

The spectroscopic instrument 10 further comprises a first mirror 14 configured to influence the radiation 13 in a beam-shaping manner. The first mirror 14 may be a concave mirror, for example. For example, the first mirror 14 may be a collimator mirror configured to collimate the radiation 13. The first mirror 14 may be arranged to be stationary, for example, or configured to be immobile.

The spectroscopic instrument 10 further comprises a movable MEMS mirror 15. The movable MEMS mirror 15 may be configured as a micromechanical component and may comprise dimensions within the range of several micrometers. The MEMS mirror 15 may be structured into a suitable substrate by means of microstructuring methods (e.g., lithography, etching techniques, etc.).

The MEMS mirror 15 comprises a rotational, or tilting, axis 16. The MEMS mirror 15 is rotatable, or tiltable, about said rotational, or tilting, axis, which is indicated by the double arrow 17.

The electromagnetic radiation 13 may be reflected by the first mirror 14 and be directed to the movable MEMS mirror 15, the radiation 13 being influenced by the first mirror 14 in a beam-shaping manner at the same time. The radiation 13 influenced in a beam-shaping manner arrives at the movable MEMS mirror 15, where it can be reflected again. In accordance with the invention, the radiation is reflected by the MEMS mirror 15 to a dispersive element 18 which is arranged to be spatially separate from the MEMS mirror 15. The dispersive element 18 may be an optical diffraction grating, a prism or a photonic crystal, for example.

The dispersive element 18 may be manufactured as an element produced by means of microsystems technology, possibly also as a compound, or may be manufactured by means of molding processes or other replication technologies.

The dispersive element 18 is advantageously arranged to be stationary, or configured to be immobile. The moveable MEMS mirror 15 is thus movable in relation to the dispersive element 18 arranged to be stationary, more precisely it is rotatable and/or tiltable. In accordance with a further feasible embodiment, the dispersive element 18 may also be movable.

The dispersive element 18 is configured to spectrally split up the radiation, which is influenced in a beam-shaping manner by the first mirror 14 and is reflected by the movable MEMS mirror 15, into various orders of diffraction. The dispersive element 18 operates in a wavelength-selective manner, i.e., the incoming radiation 13 is split up into different wavelengths; fractions of radiation of a desired wavelength or of a desired wavelength range are selectively reflected at a specific angle.

Those fractions of the radiation 13 which are split up into a limited wavelength range by means of the dispersive element 18 are reflected back to the movable MEMS mirror 15 by the dispersive element 18. In turn, the spectrally split-up radiation comprising the limited wavelength range is reflected on to a second mirror 19 by the movable MEMS mirror 15. The second mirror 19 may be a concave mirror, for example.

Figure 8:
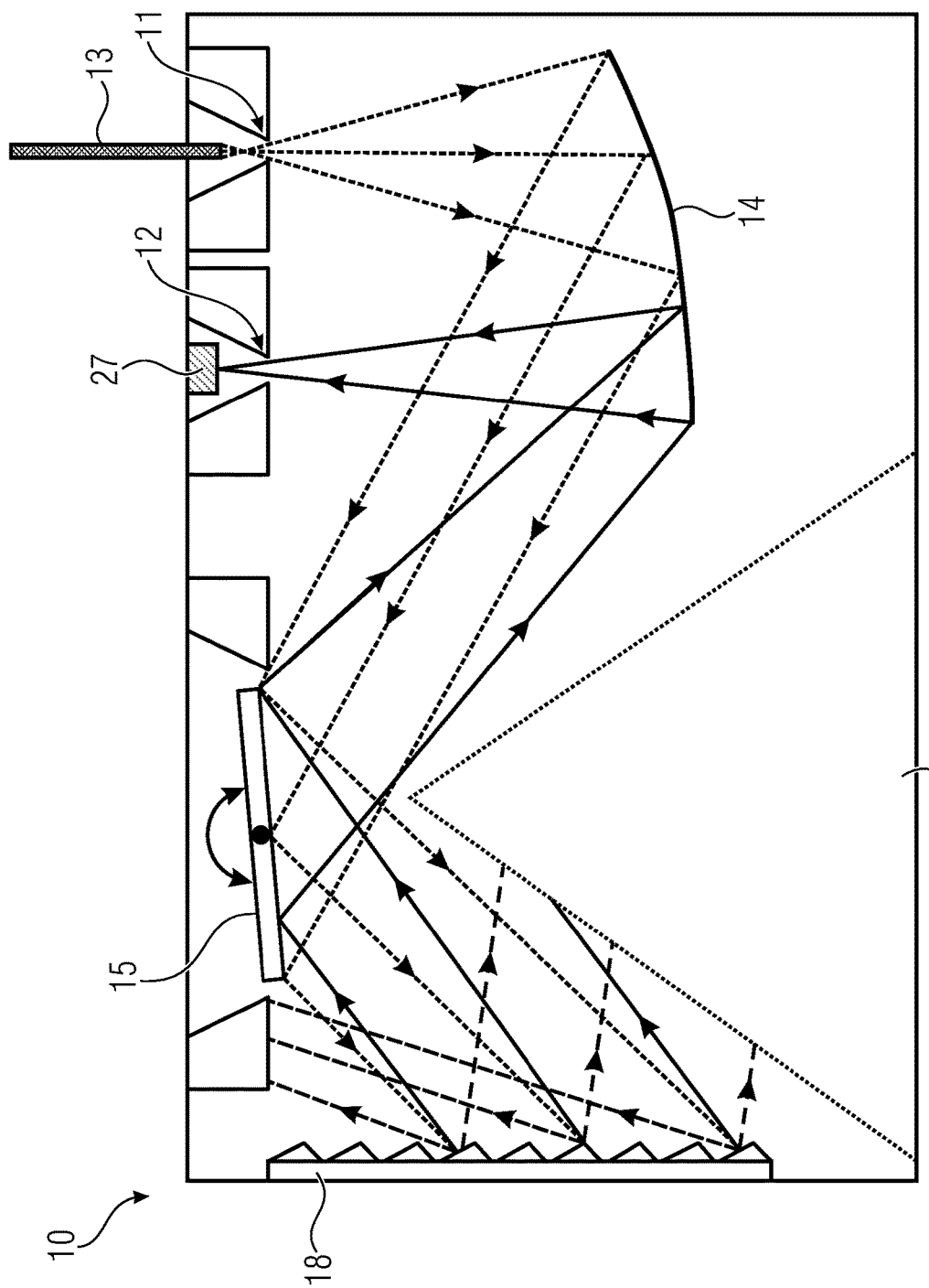
FIG. 8 shows a schematic lateral view of a spectroscopic instrument comprising a common mirror element in accordance with an embodiment.

Alternatively, only the first mirror 14 may be present as a single mirror instead of the first mirror 14 and the second mirror 19 being present, as shown in FIG. 8 by way of example and is also described with reference to FIG. 8.

The spectrally split-up radiation 13 comprising the limited wavelength range may be refocused onto the second aperture limiting device 12 by means of the first and/or second mirror(s) 14, 19. Optionally, the spectroscopic instrument 10 may comprise a detector 27 for electromagnetic radiation 13, which detector 27 may be arranged behind the second aperture limiting device 12 within the optical path.

The mutual arrangement, described by way of example with reference to FIG. 1, of the individual elements results in the optical path depicted, the propagation direction of the electromagnetic radiation 13 along said optical path being indicated by arrows.

Here it is to be noted, among other things, that the radiation reflected by the movable MEMS mirror 15 to the dispersive element 18 is split up at this very dispersive element 18. A fraction of the radiation 13 which comprises a limited but desired wavelength range is reflected back to the MEMS mirror 15. Other fractions of the radiation 13 whose wavelengths of which are outside the desired wavelength range are filtered out. For example, such a fraction of the radiation 13 will be directed in the direction of the MEMS mirror 15, but will be directed laterally past said MEMS mirror 15. A different fraction of the radiation 13 may be directed to a radiation absorption element 28, for example, within which the radiation 13 is absorbed. The radiation absorption element 28 may be configured as a pyramid, for example, and may advantageously be arranged to be located opposite the main reflection face of the MEMS mirror 15.

The above-cited elements of the spectroscopic instrument 10, i.e., the movable MEMS mirror 15, the first aperture limiting device 11, the second aperture limiting device 12, and the dispersive element 18 may be carefully aligned with respect to one another in spectroscopic instruments of conventional technology, which is also referred to as adjustment.

In order to keep the adjustment expenditure as low as possible, in the inventive spectroscopic instrument 10, the movable MEMS mirror 15 is monolithically configured, in accordance with the invention, as a common component with the first aperture limiting device 11 and/or with the second aperture limiting device 12 and/or with the dispersive element 18.

It is conceivable, for example, for the movable MEMS mirror 15 and the first aperture limiting device 11 and/or the second aperture liming device 12 to be configured within the same substrate, which would correspond to a previously mentioned monolithic configuration. Alternatively or additionally, it would also be conceivable for the movable MEMS mirror 15 and the dispersive element 18 to be formed within the same substrate, which would also correspond to a previously mentioned monolithic implementation. For example, the MEMS mirror 15 may be structured, or formed, on a common chip with the first aperture limiting device 11 and/or with the second aperture limiting device 12 and/or with the dispersive element 18.

Figure 2:
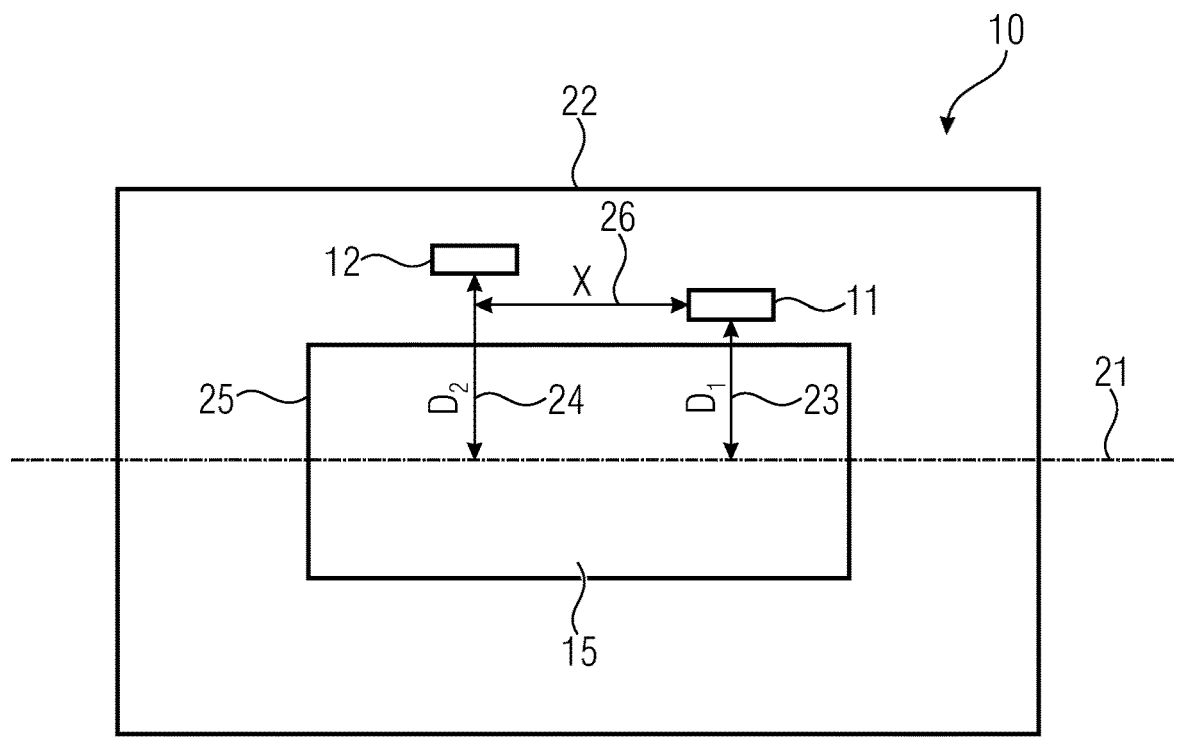
FIG. 2 shows a schematic top view of a movable MEMS mirror and aperture limiting devices monolithically configured therewith in accordance with an embodiment.

As depicted in the top view of FIG. 2, the first and second aperture limiting devices 11, 12 are additionally arranged to be spatially separate from the movable MEMS mirror 15 and exhibit a lateral offset from a rotational axis 21 of the movable MEMS mirror 15. Said lateral offset is marked by the offset axes 23, 24 in FIG. 2. The first aperture limiting device 11 is laterally spaced apart from the rotational axis 21 of the movable MEMS mirror 15 by a measure $D_1$. The second aperture limiting device 12 is spaced apart from the rotational axis 21 of the movable MEMS mirror 15 by a measure $D_2$.

In the embodiment shown here, the measures (dimensions) $D_1$ and $D_2$ differ from each other. This means that the first and second aperture limiting devices 11, 12 have different distances from the rotational axis 21 of the MEMS mirror 15, or have lateral offsets from the rotational axis 21 of the MEMS mirror 15 which differ in terms of amount.

In other embodiments not explicitly depicted here, the first and second aperture limiting devices 11, 12 may be arranged at equal distances from the rotational axis 21 of the MEMS mirror 15. In this case, the first and second aperture limiting devices 11, 12 would be arranged next to each other at the same lateral offset level, which means they would be arranged to be mutually offset in the axial direction (with regard to the rotational axis 21).

In the embodiment shown in FIG. 2, the first and second aperture limiting devices 11, 12 are also arranged to be mutually offset in an axial (in relation to the rotational axis 21) direction X, which is marked by the dimensioning arrow 26.

Both offset axes 23, 24 extend roughly orthogonally to the rotational axis 21 of the movable MEMS mirror 15. In relation to the rotational axis 21 of the MEMS mirror 15, one may also state that the first and second aperture limiting devices 11, 12 are each radially spaced apart, or offset, from the rotational axis 21 of the MEMS mirror 15.

In this context, the first and second aperture limiting devices 11, 12 are each radially offset from the rotational axis 21 along their respective offset axes 23, 24. It is to be noted within this context that the offset axis 23 of the first aperture limiting device 11 and the offset axis 24 of the second aperture limiting device 12 each pass through the MEMS mirror 15. The first and second aperture limiting devices 11, 12 are therefore each arranged to be adjacent to one side (here: the longitudinal side 25) of the MEMS mirror 15.

Figure 3:
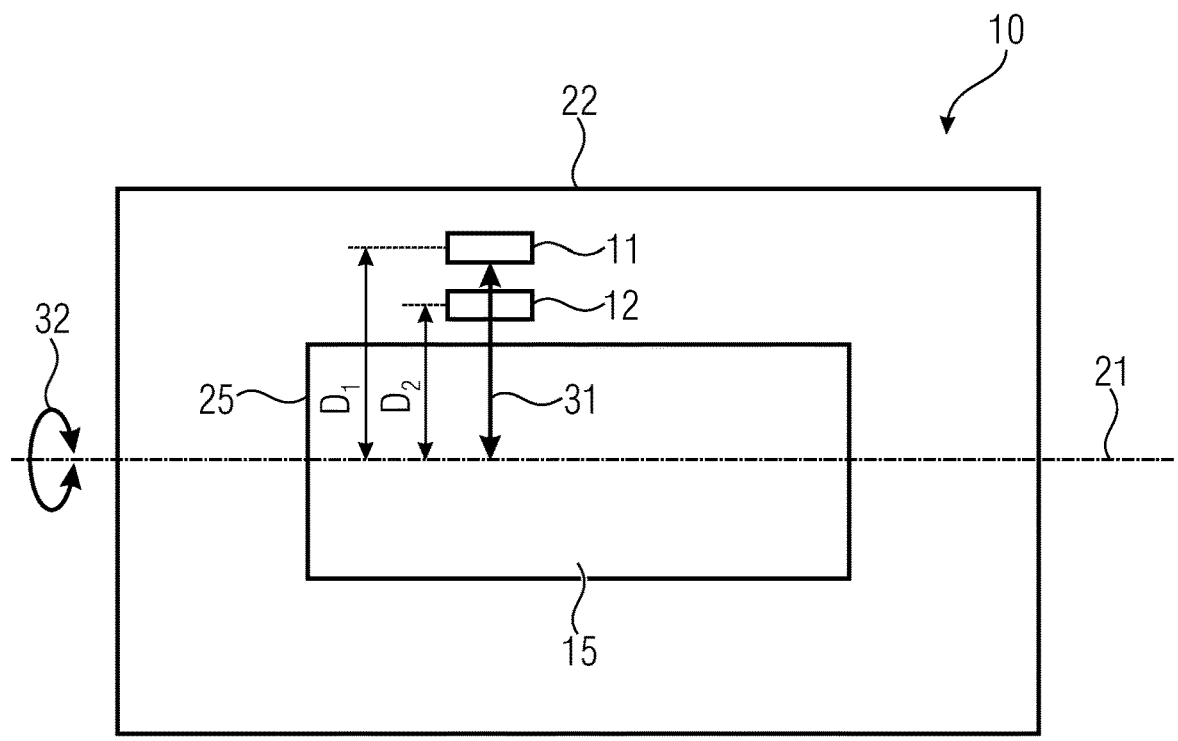
FIG. 3 shows a schematic top view of a movable MEMS mirror and aperture limiting devices monolithically configured therewith in accordance with a further embodiment.

FIG. 3 shows a further embodiment. Here, the first and second aperture limiting devices 11, 12 are arranged along a common offset axis 31. That is, the first and second aperture limiting devices 11, 12 are arranged one behind the other in the radial direction (in relation to the rotational axis 21). In the embodiment shown here, the second aperture limiting device 12 is arranged to be closer to the MEMS mirror 15 than is the first aperture limiting device 11. It would also be feasible for the first aperture limiting device 11 to be arranged to be closer to the MEMS mirror 15 than is the second aperture limiting device 12.

In the embodiment shown here, the measures $D_1$ and $D_2$ differ from each other. That is, the first and second aperture limiting devices 11, 12 have different distances from the rotational axis 21 of the MEMS mirror 15, and/or have different amounts of lateral offsets from the rotational axis 21 of the MEMS mirror 15, the first aperture limiting device 11 exhibiting a larger distance $D_1$ from the MEMS mirror 15 than does the second aperture limiting device 12.

As can be seen in FIGS. 2 and 3, the first and second aperture limiting devices 11, 12 are arranged to be spatially spaced apart from the MEMS mirror 15. At least one, but advantageously both aperture limiting devices 11, 12 may be monolithically configured as a common component with the MEMS mirror 15. For example, at least one of the aperture limiting devices 11, 12 may be configured within the same substrate 22 along with the MEMS mirror 15.

The MEMS mirror 15 itself comprises no aperture limiting devices. That is, the MEMS mirror 15 comprises a contiguous mirror surface area free from any aperture limiting devices. In other words, the entire MEMS mirror 15 is configured as a surface area free from any aperture limiting devices.

In accordance with embodiments, the MEMS mirror 15 may comprise a homogenous surface. For example, the MEMS mirror 15 may be configured as a plane mirror. The MEMS mirror 15 may also comprise a reflective surface area on both sides, i.e., on the top side (15a—see FIG. 9) and on the bottom side (15b—see FIG. 9).

The MEMS mirror 15 is movable and, in particular, rotatable, or tiltable, about the rotational, or tilting, axis 21 on both sides, which is indicated by the double arrow 32 in FIG. 3. To this end, the MEMS mirror 15 may comprise a resonant drive, for example. In this manner, the reproduction accuracy of the position of the MEMS mirror 15 may be increased, and possibly its deflection range may be increased.

For example, the MEMS mirror 15 may be deflectable within a range between ±8° or between ±5° or between ±3°. As will be described in more detail below, clearly smaller deflection ranges of the MEMS mirror 15 are sufficient for achieving desired wavelength selection of the electromagnetic radiation 13 with the inventive arrangement as compared to conventional technology.

Figure 4:
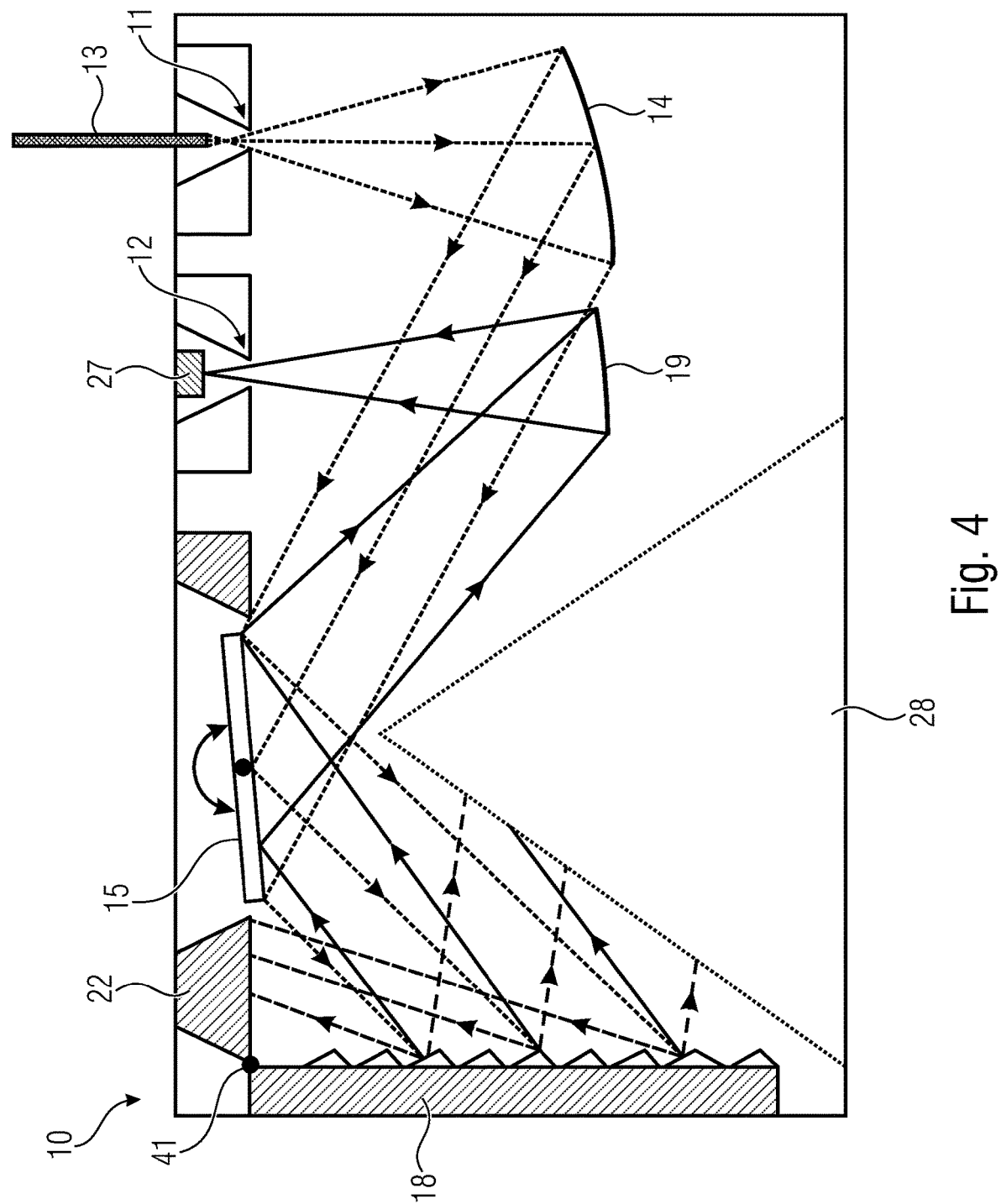
FIG. 4 shows a schematic lateral view of a spectroscopic instrument in accordance with an embodiment, wherein the movable MEMS mirror and the dispersive element are formed within a chip.

FIG. 4 shows a further feasible embodiment of an inventive spectroscopic instrument 10. The setup essentially corresponds to that of the spectroscopic instrument 10 shown in FIG. 1, the difference being, however, that here, only the dispersive element 18 is monolithically configured with the moveable MEMS mirror 15, which is depicted by means of hatched lines here by way of example.

Said monolithic configuration may be achieved, for example, in that the moveable MEMS mirror 15 and the dispersive element 18 are formed within the same substrate 22, for example by means of microstructuring methods (e.g., lithography, etching techniques, etc.); the dispersive element 18 may be tilted in relation to the MEMS mirror 15. The monolithic configuration of the dispersive element 18 with the MEMS mirror 15 is also schematically indicated in FIG. 4 by the point of connection 41.

Figure 5:
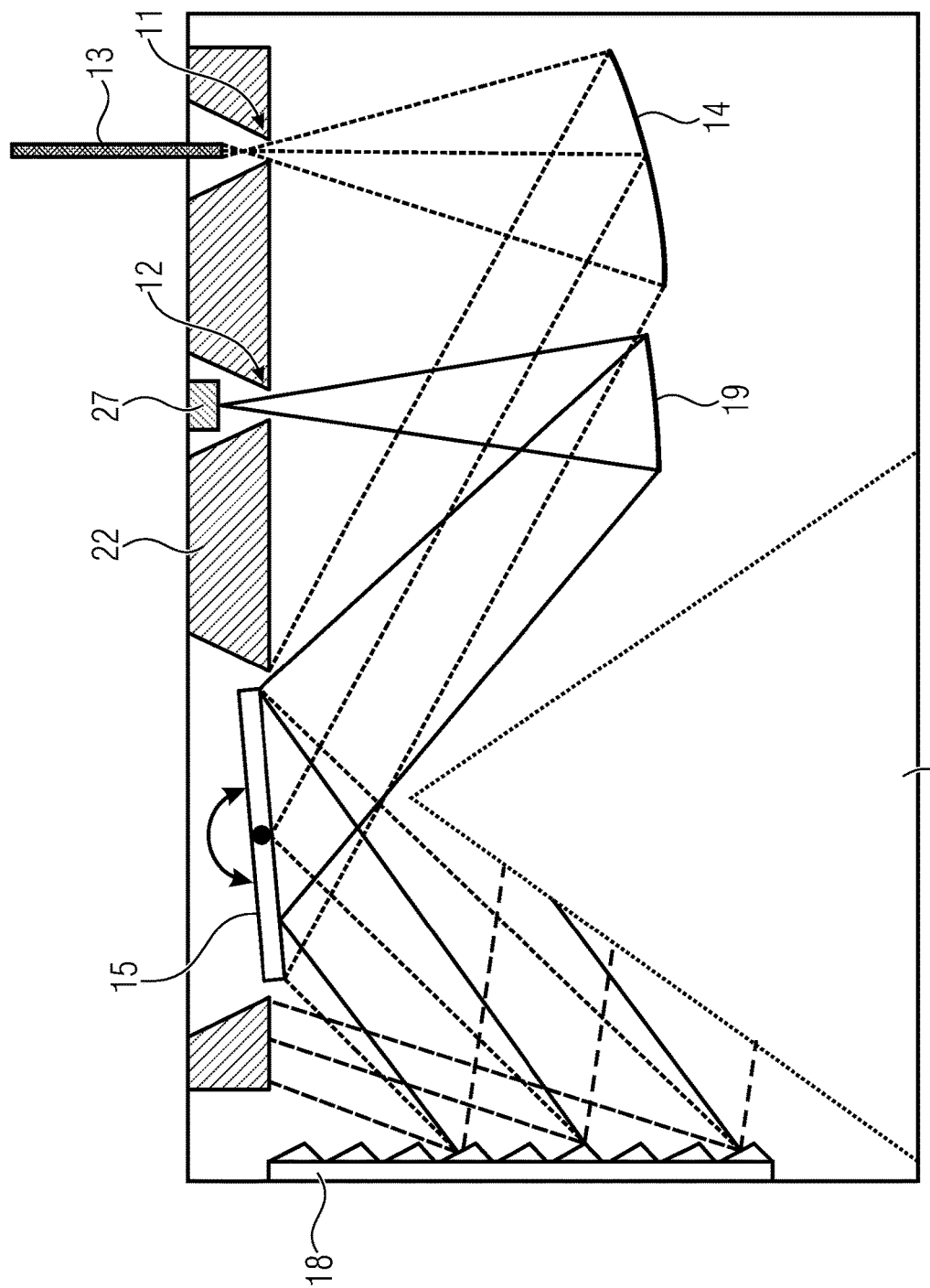
FIG. 5 shows a schematic lateral view of a spectroscopic instrument in accordance with an embodiment, wherein the movable MEMS mirror and the aperture limiting devices are formed within a chip.

FIG. 5 shows a further feasible embodiment of an inventive spectroscopic instrument 10. The setup essentially corresponds to that of the spectroscopic instrument 10 shown in FIG. 1, the difference being, however, that here, both the first aperture limiting device 11 and the second aperture limiting device 12 are monolithically configured with each other and monolithically configured with the MEMS mirror 15 as a common component. In the embodiment depicted in FIG. 1, it is feasible, however, that both aperture limiting devices 11, 12 be configured as discrete elements or components rather than being configured monolithically as a common component; however, at least one of both aperture limiting devices 11, 12 may be monolithically configured with the MEMS mirror 15 within this context.

In the embodiment shown in FIG. 5, e.g., the MEMS mirror 15, the first aperture limiting device 11 and the second aperture limiting device 12 may be monolithically configured, i.e., configured both within the same substrate 22, which here is shown to be hatched. This arrangement would roughly correspond to the top view shown in FIG. 3.

Figure 6:
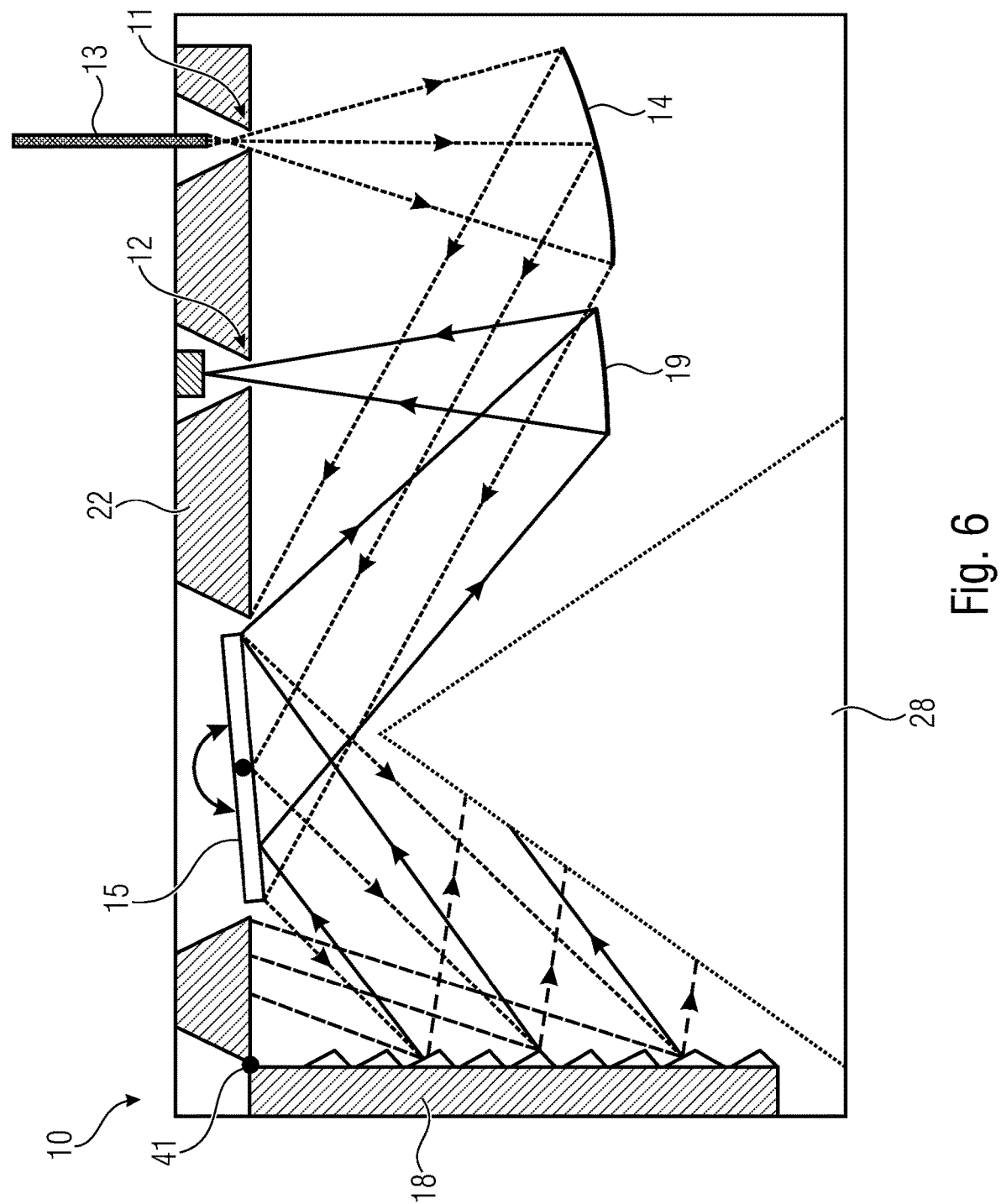
FIG. 6 shows a schematic lateral view of a spectroscopic instrument in accordance with an embodiment, wherein the movable MEMS mirror and the dispersive element and the aperture limiting devices are formed within a chip.

FIG. 6 shows a further feasible embodiment of an inventive spectroscopic instrument 10. The setup essentially corresponds to that of the spectroscopic instrument 10 shown in FIG. 1, the difference being, however, that here, the first aperture limiting device 11 and the second aperture limiting device 12 and the dispersive element 18 are monolithically configured as a common component with the MEMS mirror 15.

For this purpose, for example, the MEMS mirror 15, the first aperture limiting device 11, the second aperture limiting device 12, and the dispersive element 18 may be monolithically configured within the same substrate 22 together, which here is shown to be hatched. Monolithic configuration of the dispersive element 18 with the MEMS mirror 15 here is also schematically shown by the point of connection 41.

Figure 7:
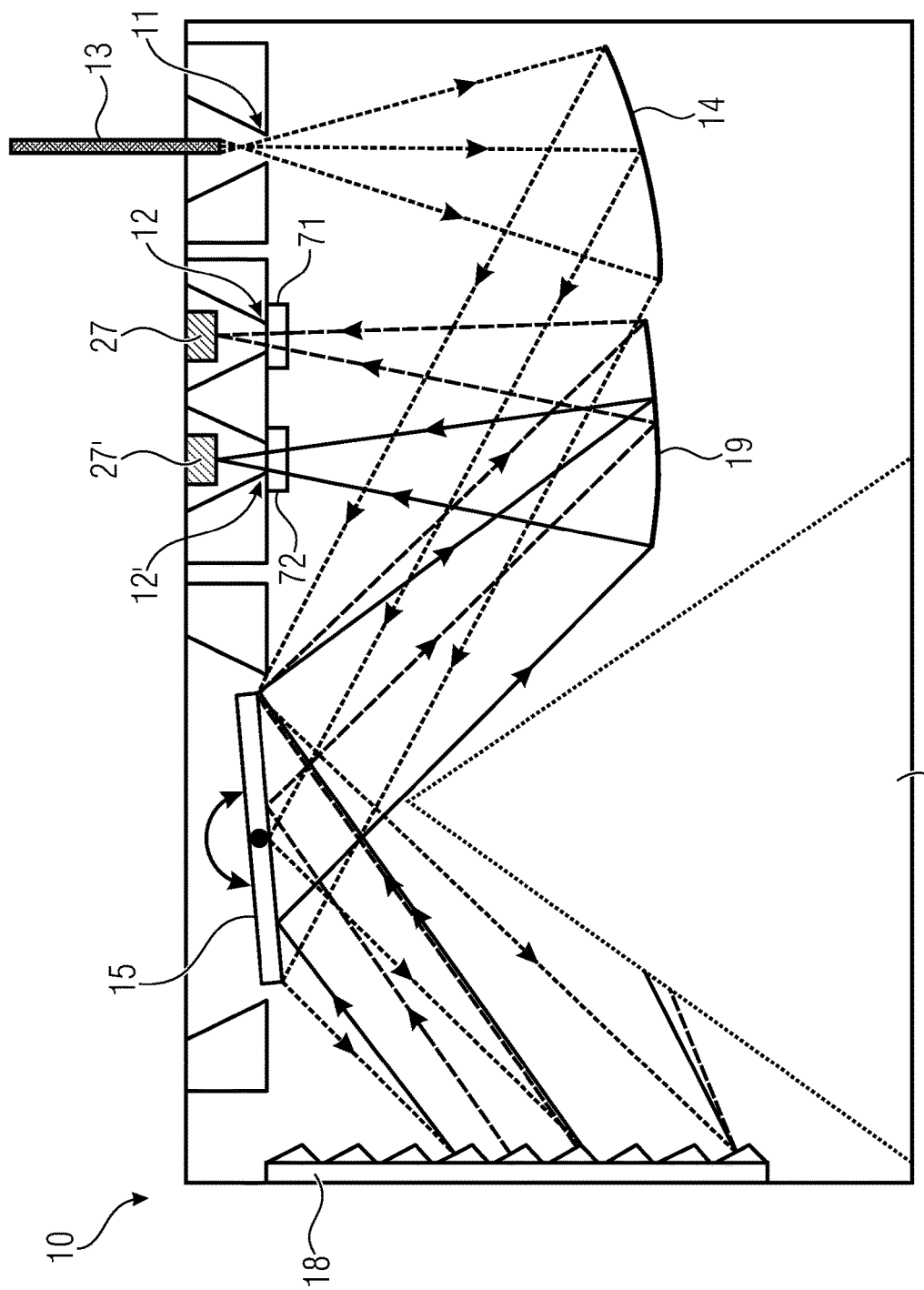
FIG. 7 shows a schematic lateral view of a spectroscopic instrument comprising several detectors of different spectral ranges and/or comprising order filters in accordance with an embodiment.

FIG. 7 shows a further feasible embodiment of an inventive spectroscopic instrument 10. The setup essentially corresponds to that of the spectroscopic instrument 10 shown in FIG. 1, the difference being, however, that the spectroscopic instrument 10 comprises a third aperture limiting device 12'. The third aperture limiting device 12' may be configured or arranged just like the second aperture limiting device 12, so that the reflected electromagnetic radiation 13 passes through it.

Quite generally, the first aperture limiting device 11 may be referred to as an entrance aperture limiting device, and the second and third aperture limiting devices 12, 12' may be referred to as exit aperture limiting devices.

In addition, the spectroscopic instrument 10 may comprise, in accordance with this embodiment, an additional detector 27' for electromagnetic radiation 13 which is arranged behind the third aperture limiting device 12' within the optical path. The optical path resulting for said spectroscopic instrument 10 in turn is symbolized by arrows.

Here one can see, among other things, that the radiation reflected by the movable MEMS mirror 15 to the dispersive element 18 is split up at said very dispersive element 18. A first fraction of the radiation 13 which comprises a limited but desired first wavelength range is reflected back to the MEMS mirror 15. Likewise, a second fraction of the radiation 13 which comprises a limited but also desired second wavelength range is reflected back to the MEMS mirror 15.

Other fractions of the radiation 13 whose wavelengths of which are outside the desired wavelength ranges are filtered out. For example, such an undesired fraction of the radiation 13 will be directed in the direction of the MEMS mirror 15, but will be directed laterally past said MEMS mirror 15. A different undesired fraction of the radiation 13 may be directed to a radiation absorption element 28, for example, within which the radiation 13 is absorbed.

Those fractions of radiation which exhibit the desired first and the second wavelength ranges are reflected back via the MEMS mirror 15 and may now be directed to one of both exit aperture limiting devices 12, 12' either via the first mirror 14 or, as depicted, via the second mirror 19.

More specifically, a first fraction of the radiation 13 which comprises the first desired wavelength range may be directed to the second aperture limiting device 12, and a second fraction of the radiation 13 which comprises the second desired wavelength range may be directed to the third aperture limiting device 12'.

Thus, the first fraction of the radiation 13 which has the first desired wavelength range impinges on the detector 27 arranged behind the second aperture limiting device 12, and the second portion of the radiation 13 which has the second desired wavelength range impinges on the detector 27' arranged behind the third aperture limiting device 12'. Detection of the respectively impinging fractions of the radiation may therefore be effected, in accordance with this embodiment, in a wavelength-selective manner for two different wavelength ranges.

In order to narrow said wavelength ranges even more accurately, spectral order filters may be employed. For example, a spectral order filter 71 may be arranged at the second aperture limiting device 12. Alternatively or additionally, a spectral order filter 72 may be arranged at the third aperture limiting device 12'. Advantageously, the spectral filter ranges of both spectral order filters 71, 72 differ from each other.

A spectral order filter 71, 72 may also be employed, however, in embodiments of the spectroscopic instrument 10 wherein only one exit aperture limiting device 12 is provided, such as in the previously described embodiments, for example.

In the embodiment of the spectroscopic instrument 10 which is shown in FIG. 7, at least the second aperture liming device 12 and the third aperture limiting device 12' may be monolithically configured with each other. In addition, the second aperture limiting device 12 and the third aperture limiting device 12' may be monolithically configured with at least one of the first aperture limiting device 11, the MEMS mirror 15, and the dispersive element 18.

Advantageously, all elements, i.e., the first aperture limiting device 11, the second aperture limiting device 12, the third aperture limiting device 12', the MEMS mirror 15, and the dispersive element 18, may be monolithically configured with one another as a common component.

In the embodiment depicted in FIG. 7, a particularly wide spectral range may be addressed which may comprise ambiguities because of higher orders of diffraction. However, several exit aperture limiting devices 12, 12' (in FIG. 7, two exit slits are shown by way of example) may be used which may be adjusted in a targeted manner, in combination with spectral filters 71, 72 (so-called order filters) in terms of their spectral properties. In this manner, a system may be achieved, in particular, which may sense two spectral ranges comprising different cut-off wavelengths.

For example, one of the two detectors 27, 27' may be configured as a low-cost detector based on silicon components which may sense a first spectral range up to an upper cut-off wavelength of 1100 nm. The respectively other one of both detectors 27, 27' may be a detector which may be implemented by means of InGaAs or extended InGaAs components and which may sense a second spectral range, which second spectral range may adjoin the first spectral range and may cover an upper cut-off wavelength of up to 1900 nm or even up to 2500 nm (when cooled detectors are used).

In slightly more general terms, a first detector 27 may comprise silicon, and a second detector 27' may comprise a compound of materials from the chemical main groups III and V or a compound of materials of the chemical main groups II and VI, wherein the second detector 27' may be configured to detect a spectral range up to an upper cut-off wavelength which is larger than an upper cut-off wavelength of the first detector 27 and optionally adjoins the first cut-off wavelength.

It holds true for all embodiments that the detector 27, which is associated with the first aperture limiting device 12, may comprise silicon and/or a compound of materials from the chemical main groups III and V, or a compound of materials from the chemical main groups II and VI. For example, the detector 27 may comprise indium gallium arsenide (InGaAs) with a band edge of up to 2.6 μm (E-IGA: extended indium gallium arsenide), which may be grown on indium phosphide (InP) wafers if additional layers are used for adjusting the grating constant.

What also generally holds true for all embodiments is that the spectroscopic instrument 10 may be configured to perform a spectral analysis of light within a wavelength range between 780 nm and 2500 nm or between 900 nm and 2200 nm, or between 950 nm and 1900 nm. Advantageously, the spectroscopic instrument 10 has a spectral resolution of 10 nm or less.

FIG. 8 shows a further feasible embodiment of an inventive spectroscopic instrument 10. The setup essentially corresponds to that of the spectroscopic instrument 10 shown in the previous figures, the difference being, however, that the spectroscopic instrument 10 comprises only the first mirror 14. As was already mentioned with reference to the previous embodiments, the radiation 13 reflected back by the MEMS mirror 15 may be reflected back to the first mirror 14. The latter may be a concave mirror with a sufficiently large reflective surface area, so that that fraction of the radiation 13 which is reflected back by the MEMS mirror 15 may be directed to the exit aperture limiting device 12 (or to all existing exit aperture limiting devices 12, 12').

Accordingly, therefore, the first mirror 14 may be used for beam shaping (e.g., collimation) and refocusing (e.g., to an exit aperture limiting device 12, 12'). The configuration comprising only the first mirror 14 may be combined with any other embodiments of the spectroscopic instrument 10.

As was mentioned at the outset, the MEMS mirror 15 may be monolithically configured, in accordance with the invention, as a common component with at least one of the first aperture limiting device 11, the second aperture limiting device 12, and the dispersive element 18. As compared to conventional technology, this offers the advantage that the individual elements 11, 12, 15, 18 need not be positioned in relation to one another in a manner involving a large amount of expenditure. Thus, adjustment, which in conventional technology involves a large amount of expenditure, is dispensed with, which results in marked cost reductions in production, on the one hand, and in a clearly increased precision level of the spectroscopic instrument, on the other hand.

A further decisive advantage over conventional technology consists in that the same spectral range may be addressed with merely half the deflection of the MEMS mirror 15 as compared to conventional technology with movable diffraction gratings. In accordance with the invention, deflections the MEMS mirror 15 which lie within the range of ±8° or between ±5° or even only between ±3° may be sufficient here so as to be able to address, in combination with the immobile dispersive element 18 arranged in a spatially separate manner, the spectral range indicated herein.

The reason for this is, among other things, that the movable MEMS mirror 15 may be used both for reflecting the radiation 13 to the dispersive element 18 and for reflecting back the radiation split up at the dispersive element.

In order to ensure as high a precision level for the deflection of the MEMS mirror 15 as possible, the spectroscopic instrument 10 may comprise a position sensor for sensing the actual position of the MEMS mirror 15.

Figure 9:
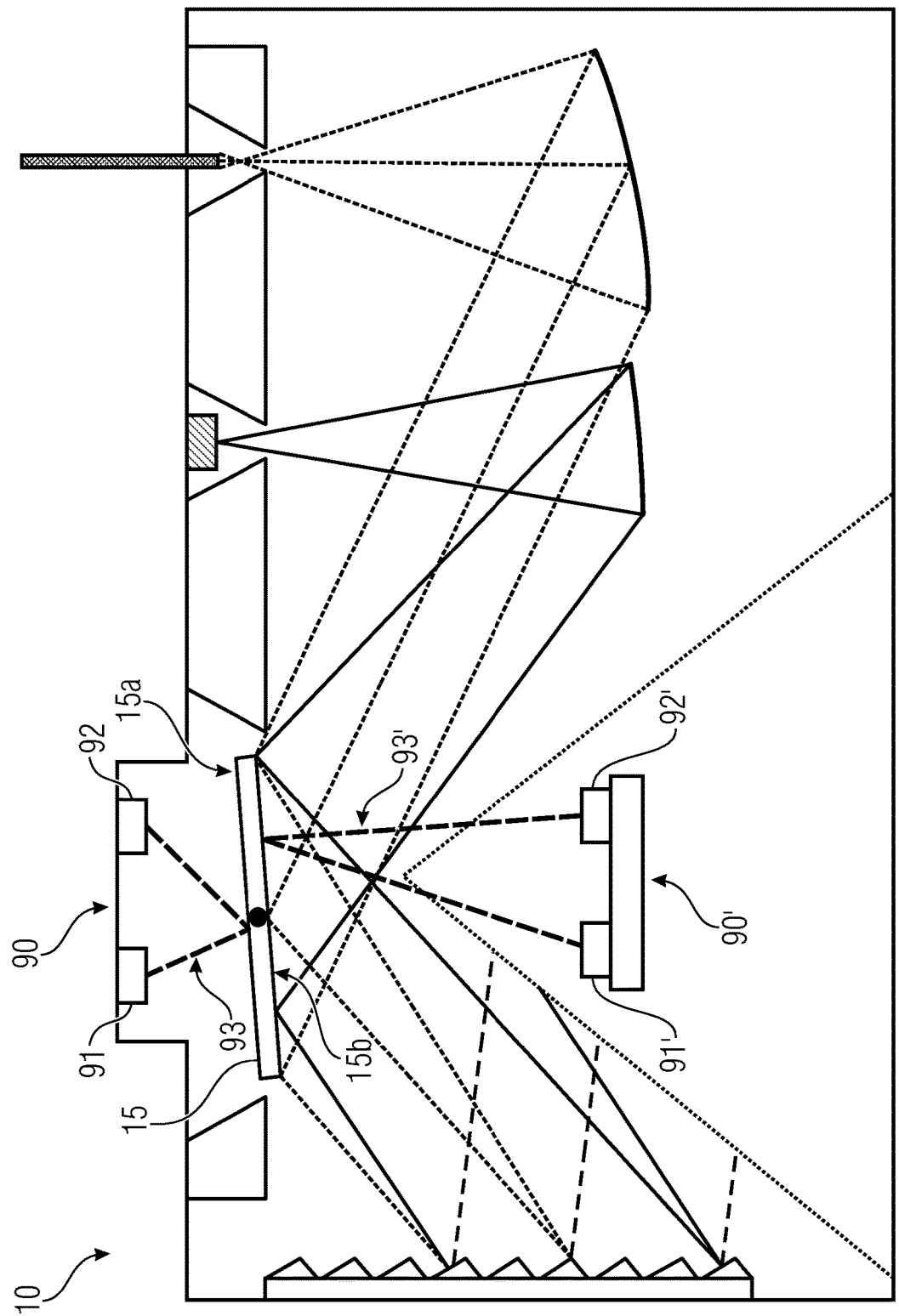
FIG. 9 shows a schematic lateral view of a spectroscopic instrument comprising a position sensor in accordance with an embodiment.

FIG. 9 shows, by way of example, an inventive spectroscopic instrument 10 comprising such a position sensor 90. The position sensor 90 may be arranged, e.g., adjacent to a rear side 15a of the MEMS mirror 15. The rear side 15a would correspond to a side of the MEMS mirror 15 which faces away from the optical path. Said rear side 15a may also comprise a surface area that is reflective for optical radiation.

Alternatively or additionally, the position sensor 90 and/or an additional position sensor 90' may be arranged to be adjacent to a front side 15b of the MEMS mirror 15. The front side 15b would correspond to a side of the MEMS mirror 15 which faces the optical path. Positioning at the radiation absorption element 28 here is merely exemplary and serves only illustration purposes.

Advantageously, the position sensor 90, 90' is an optical position sensor comprising a radiation source 91, 91' for emitting electromagnetic radiation 93, 93' and at least one radiation detector 92, 92' for sensing the electromagnetic radiation 93, 93' emitted by the radiation source 91, 91'. In accordance with an embodiment, the radiation detector 92, 92' may comprise at least two radiation-detecting elements.

In accordance with a further feasible embodiment, the movable MEMS mirror 15 may be configured to at least partly reflect the electromagnetic radiation 93, 93' emitted by the radiation source 91, 91' associated with the position sensor 90, 90'. Thus, a separate mirror for reflecting the emitted radiation 93, 93', which may be used for the optical position sensor 90, 90' is dispensed with.

As is shown in FIG. 9 by way of example, with a position sensor 90 arranged to be adjacent to the rear side 15a of the MEMS mirror 15, the rear side 15a of the MEMS mirror 15 can be used accordingly, and with a position sensor 90' arranged to be adjacent to the front side 15b of the MEMS mirror 15, the front side 15b of the MEMS mirror 15 can be used.

In accordance with a further feasible embodiment, the position sensor 90, 90' may be configured to sense deflection of the moveable MEMS mirror 15 in a time-continuous or time-discrete manner.

Moreover, the position sensor 90, 90' may be configured to differentially determine a position of the movable MEMS mirror 15 by forming the difference between a first position sensor signal and a second position sensor signal. To this end, the spectroscopic instrument 10 may comprise two position sensors 90, 90' which, as shown in FIG. 9, may either be arranged to be adjacent to different sides 15, 15b of the MEMS mirror 15, or may be arranged to be adjacent to one of both sides 15a, 15b of the MEMS mirror 15.

One of the two position sensors 90, 90' here may provide the first position sensor signal, and the respectively other one of the two position sensors 90, 90' may accordingly provide the second position sensor signal which is used for forming the difference.

Alternatively or additionally to both position sensors 90, 90', at least one of the two position sensors 90, 90' may comprise at least two radiation sources, a first radiation source providing the first position sensor signal, and a second radiation source providing the second position sensor signal used for forming the difference. In this case, a single position sensor, comprising at least two radiation sources, would be sufficient for differentially sensing the position of the MEMS mirror 15.

In principle, the at least one position sensor 90, 90' may be combined with any further embodiments of the inventive spectroscopic instrument 10.

Subsequently, the invention is to be summarized once again in other words:

The object underlying the invention may be achieved by using, in the optical setup, a movable mirror 15, typically a plane mirror, which directs the light rays 13 onto a fixed grating 18 and from there directs monochromatic light, which comes back at a specific angular interval, to a detector 27. This arrangement has the advantage that the dynamic deflection of the component 15 as compared to a moved grating 18 needs to exhibit only half the amplitude in order to address the same spectral range. In addition, a simple mirror will suffice under certain circumstances. The fixed grating 18 may be manufactured as an element produced by means of microsystems technology, possibly also as a compound, or may be manufactured by means of molding processes or other replication technologies.

The inventive system 10 may be employed wherever information about an object is to be obtained via spectral analysis, in particular within the near-infrared spectral range. The option of extreme miniaturization seems to offer good prospects for mobile applications and, in particular, integration into a mobile terminal such as a mobile phone, for example. Mobile measurement, e.g., performed on foodstuff in a shop prior to purchase, may be performed by a layperson while using corresponding software. The sample is illuminated with the light of a corresponding source built into the device, and the electromagnetic radiation scattered back is analyzed by using the inventive system. The measurement values are evaluated, for which purpose a database comprising reference data may be used online or in a manner in which it is stored within the device, for example. The results are displayed to the user. A combination with other means is possible as described in DE 10 2017 204 740.2.

What is relevant for the embodiments is the implementation of the actual system 10, which may be employed in various configuration variants for the applications indicated and numerous other ones.

1. In a first embodiment, a spectrometer is implemented for the inventive system 10 as shown in FIG. 1, said spectrometer being based on a moved mirror 15 which is manufactured in MEMS technology and exhibits a resonant drive. A fixed grating 18 splits the incident light 13 into its spectral constituents. A specific wavelength interval is directed, as a function of the current position of the mirror 15, to a detector 27, which generates an electronically evaluable signal, via the mirror 15 and through an aperture-limiting slit 12.

While using a grating 18 comprising about 600 lines per millimeter, a spectral range from 950 nm to 1900 nm may be addressed by using a MEMS mirror 15 which may be mechanically deflected by +/−5°.

By means of a detector 27 of the group of "extended InGaAs", a signal having a sufficient signal/noise ratio may be captured even without cooling the detector to low temperatures.

With a suitably selected width of the entrance and exit slits 11, 12, a resolution of, e.g., 10 nm may be achieved, which is considered advantageous for evaluating the data.

The system 10 may comprise a design size of less than $30\times20\times15$ mm$^3$ and is thus very small as compared to commercially available near-infrared spectrometers. A further reduction of the system 10 in size, for example with the aim of integrating it into a mobile phone, seems promising. With a slightly reduced resolution, dimensions of $10\times10\times6$ mm$^3$ are realistic, possibly also a smaller height of only 4.5 mm, however with a reduced light intensity of the system 10.

2. The embodiments shown in FIGS. 4, 5 and 6 represent variants of the component of the present invention. The scanner mirror 15 and the grating 18 are produced to be located within one chip and to be deflectable toward each other.

A major advantage over conventional technology consists in the fact that no adjustment is necessary in order to mutually align the grating 18 and the scanner 15 (and/or, optionally, also slits 11, 12).

3. The embodiment depicted in FIG. 7 shows a multiple detector and/or order filter wherein a particularly wide spectral range is addressed which may have ambiguities because of higher orders of diffraction, wherein several exit slits 12, 12' (by way of example, FIG. 7 shows two exit slits 12, 12') are used which may be adjusted in a targeted manner in terms of their spectral properties by using spectral filters 71, 72 (so-called order filters). In this manner, a system 10 may be achieved, in particular, which senses a first spectral range up to the upper cut-off wavelength within the range of 1100 nm by means of a low-cost first detector 27 based on silicon components, and which additionally senses a second spectral range adjoining the first spectral range and reaching up to 1900 nm or even up to 2200 nm (when using cooled detectors) by using a second detector 27', the second detector 27' being implementable by means of InGaAs and/or extended InGaAs components.

4. Setup as a stack of substrates, as described in U.S. Pat. No. 8,045,159 B2.

5. Setup by means of folding assembly

The inventive spectroscopic instrument 10 may further be implemented in the form of the following embodiments:

A1. Spectroscopic instrument 20 and component for manufacturing same, characterized in that the system 10 comprises a fixed grating 18 for splitting up electromagnetic radiation 13 (e.g., light) into its constituents, as well as a movable mirror 15 produced in a method of microsystems technology, incident light 13 with a limited aperture is incident upon the movable mirror 15 in an at least approximately collimated manner, is directed onto the fixed grating 18 from said mirror 15, and reflected light of a limited wavelength interval impinges, via the same mirror 15 and an optional further optical element 19, on a detector 27 with a limited spatial aperture or on an exit slit 12 of the system 10, in this manner, the wavelength range—related the deflection of the movable component 15—that may be achieved is increased (doubled) as compared to a system having the same grating, given the same deflection range.

A2. Spectroscopic instrument 10 and component in accordance with embodiment A1, characterized in that an entrance slit 11 and an exit slit 12 are used for aperture limitation.

A3. Spectroscopic instrument 10 and component in accordance with embodiment A1 or A2, characterized in that a resonant drive is used for the component and that as a result, the reproduction accuracy of the position is increased and that possibly the deflection range is increased.

A4. Spectroscopic instrument 10 and component in accordance with any of embodiments A1 to A3, characterized in that
a position sensor 90 is used which provides information correlated with the current position of the scanner component 15, and/or
a position sensor 90 is used which comprises a trigger position sensor providing a signal for at least one specific position, and/or
a rear-side position sensor uses the rear side 15a of the scanner component 15 for sensing the position, and/or
an integrated position sensor is integrated directly into the component.

A5. Spectroscopic instrument 10 and component in accordance with any of embodiments A1 to A4, characterized in that the grating 18 for spectrally decomposing the electromagnetic radiation 13 and the movable mirror 15 are implemented together within a component, the configuration being designed such that both parts may be deflected against each other at least once.

A6. Spectroscopic instrument 10 and component in accordance with any of embodiments A1 to A5, characterized in that the grating 18 and slits 11, 12 and/or grating 18, slits 11, 12, and mirror 15 are provided together in one component A7. Spectroscopic instrument 10 and component in accordance with any of embodiments A1 to A6, characterized in that
a plurality of detectors 27, 27' are used which may differ in terms of their spectral sensitivity distribution, and/or that by using spectral filter means 71, 72, e.g., so-called order filters, sensitivity distribution is influenced in a targeted manner, it being possible for the plurality of detectors 27, 27' to be arranged behind one or more exit slits 12, 12' whose positions may deviate from one other.

A8. Spectroscopic instrument 10 and component in accordance with any of embodiments A1 to A7, characterized in that the same mirror surface 14 is used for collimation and refocusing.

A9. Spectroscopic instrument 10 and component in accordance with any of embodiments A1 to A8, characterized in that the spectroscopic instrument 10 is set up as a stack of functional substrates.

A10. Spectroscopic instrument 10 and component in accordance with any of embodiments A1 to A9, characterized in that the spectroscopic instrument 10 is set up in accordance with the principle of a folding box.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SOURCES

[1] H. Grüger, T. Pügner, J. Knobbe, H. Schenk, "First application close measurements applying the new hybrid integrated MEMS spectrometer", Proc. of SPIE Val. 8726 872609-1-872609-09 (2013)

[2] Tino Puegner, Jens Knobbe, Hubert Lakner, Basic angles in microelectromechanical system scanning grating spectrometers, APPLIED OPTICS Val. 50, No. 24, 20 Aug. 2011, 4894-4902

[3] T. Pügner, J. Knobbe, H. Grüger, "Near-Infrared Grating Spectrometer for Mobile Phone Applications", Applied Spectroscopy 2016, Val. 70(5) 734-745 (2016)

The invention claimed is:

1. Spectroscopic instrument comprising
a first aperture limiting device, a second aperture limiting device, a first mirror, a movable MEMS mirror, and a dispersive element spatially separate from the MEMS mirror, the movable MEMS mirror being movable in relation to the dispersive element,
the first mirror being configured to influence, in a beam-shaping manner, electromagnetic radiation which enters through the first aperture limiting device, and to direct the influenced radiation to the movable MEMS mirror,
the moveable MEMS mirror being configured to reflect the influenced radiation to the dispersive element,
the dispersive element being configured to spectrally split up the influenced radiation and to reflect it back, within a limited wavelength range, to the moveable MEMS mirror, and the movable MEMS mirror further being configured to reflect the spectrally split-up radiation comprising the limited wavelength range to the first mirror or to a second mirror and from there to the second aperture limiting device,
the movable MEMS mirror being monolithically configured as a common component with at least one of the first aperture limiting device, the second aperture limiting device, and the dispersive element, and the first and second aperture limiting devices being arranged to be spatially separate from the movable MEMS mirror and comprising a lateral offset from a rotational axis of the movable MEMS mirror.

2. Spectroscopic instrument as claimed in claim 1, wherein the first and second aperture limiting devices each are offset along an offset axis extending orthogonally to the rotational axis of the movable MEMS mirror, the respective offset axis of the respective aperture limiting device extending through the MEMS mirror.

3. Spectroscopic instrument as claimed in claim 1, wherein the first aperture limiting device and the second aperture limiting device are arranged on a common offset axis.

4. Spectroscopic instrument as claimed in claim 1, wherein the movable MEMS mirror comprises a contiguous surface area that is free from any aperture limiting devices.

5. Spectroscopic instrument as claimed in claim 1, wherein the movable MEMS mirror is configured as a plane mirror.

6. Spectroscopic instrument as claimed in claim 1, wherein the movable MEMS mirror comprises a resonant or quasi-static drive.

7. Spectroscopic instrument as claimed in claim 1, wherein the movable MEMS mirror is deflectable within a range between ±8° or between ±5° or between ±3°.

8. Spectroscopic instrument as claimed in claim 1, the spectroscopic instrument further comprising a position sensor for sensing the deflection of the movable MEMS mirror.

9. Spectroscopic instrument as claimed in claim 8, wherein the position sensor is configured as an optical position sensor comprising a radiation source for emitting electromagnetic radiation and at least one radiation detector for sensing the electromagnetic radiation emitted by the radiation source.

10. Spectroscopic instrument as claimed in claim 9, wherein the radiation detector comprises at least two radiation-detecting elements.

11. Spectroscopic instrument as claimed in claim 9, wherein the movable MEMS mirror is configured to at least partly reflect the electromagnetic radiation emitted by the radiation source associated with the position sensor.

12. Spectroscopic instrument as claimed in claim 8, wherein the position sensor is configured to sense the deflection of the movable MEMS mirror in a time-continuous or time-discrete manner.

13. Spectroscopic instrument as claimed in claim 8, wherein the position sensor is configured to differentially determine a position of the movable MEMS mirror by forming the difference between a first position sensor signal and a second position sensor signal.

14. Spectroscopic instrument as claimed in claim 1, the spectroscopic instrument comprising at least one detector for electromagnetic radiation which is arranged behind the second aperture limiting device within the optical path.

15. Spectroscopic instrument as claimed in claim 14, wherein the detector comprises silicon or a compound of materials from the chemical main groups III or V, or a compound of materials from the chemical main groups II and VI.

16. Spectroscopic instrument as claimed in claim 14, the spectroscopic instrument comprising a third aperture limiting device and an additional sensor for electromagnetic radiation, the detector for electromagnetic radiation being arranged behind the second aperture limiting device within the optical path, and the additional sensor for electromagnetic radiation being arranged behind the third aperture limiting device within the optical path.

17. Spectroscopic instrument as claimed in claim 16, wherein the MEMS mirror, the dispersive element, the first aperture limiting device, the second aperture limiting device, and the third aperture limiting device are monolithically configured as a common component.

18. Spectroscopic instrument as claimed in claim 16, wherein the second aperture limiting device has a first spectral order filter arranged thereat, and wherein the third aperture limiting device has a second spectral order filter arranged thereat, the spectral filter ranges of the first order filter and of the second order filter differing from each other.

19. Spectroscopic instrument as claimed in claim 16, wherein the detector for electromagnetic radiation comprises silicon, and wherein the additional detector for electromagnetic radiation comprises a compound of materials from the chemical main groups III or V, or a compound of materials from the chemical main groups II and VI, and wherein the additional detector for electromagnetic radiation is configured to detect a spectral range up to an upper cut-off wavelength higher than an upper cut-off wavelength of the detector for electromagnetic radiation.

20. Spectroscopic instrument as claimed in claim 14, wherein the detector for electromagnetic radiation is configured to sense a spectral range up to an upper cut-off wavelength of 1100 nm, and wherein the additional detector for electromagnetic radiation is configured to detect a spectral range up to an upper cut-off wavelength of 1700 nm or 1900 nm or 2200 nm, or 2500 nm.

21. Spectroscopic instrument as claimed in claim 1, the spectroscopic instrument being configured to perform a spectral analysis of light within a wavelength range from 780 nm to 2500 nm or from 900 nm to 2200 nm, or from 950 nm to 1900 nm.

22. Spectroscopic instrument as claimed in claim 1, the spectroscopic instrument comprising a spectral resolution of 10 nm or less.

23. Spectroscopic instrument as claimed in claim 1, wherein the dispersive element is an optical diffraction grating.

24. Spectroscopic instrument as claimed in claim 23, wherein the diffraction grating comprises between 150 and 1200 lines per millimeter.

25. Spectroscopic instrument as claimed in claim 1, wherein the dispersive element is a prism.

26. Spectroscopic instrument as claimed in claim 1, the spectroscopic instrument comprising dimensions, with regard to a ratio of length×width×height, of 30×20×15 mm$^3$ or less, or 10×10×6 mm$^3$ or less, or 10×10×4.5 mm$^3$ or less.

27. Spectroscopic instrument as claimed in claim 1, wherein the movable MEMS mirror, the dispersive element as well as the first aperture limiting device and/or the second aperture limiting device are configured within a common substrate by using silicon microtechnology or by means of microstructuring methods.

* * * * *